April 8, 1941.   B. F. WADDELL   2,237,720
TEMPERATURE REGULATOR
Filed Jan. 17, 1938   2 Sheets-Sheet 1
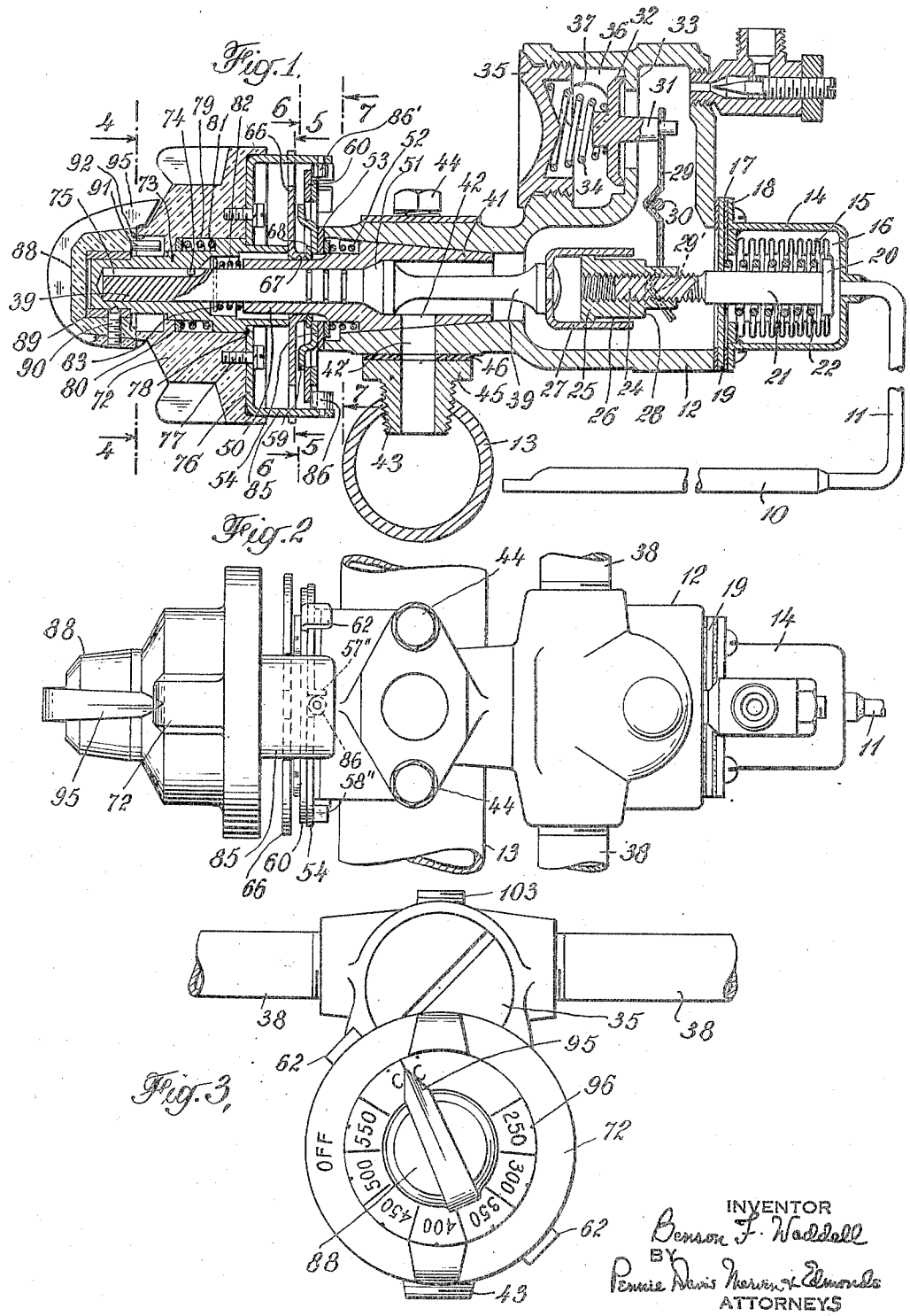
INVENTOR
Benson F. Waddell
BY
Pennie Davis Marvin & Edmonds
ATTORNEYS

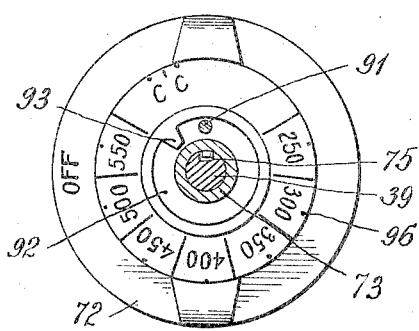
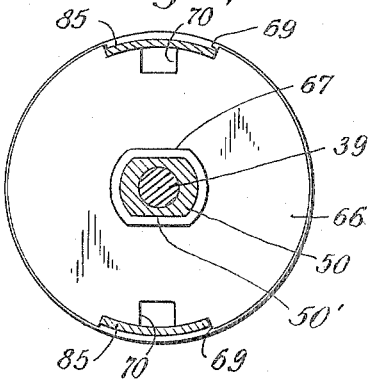
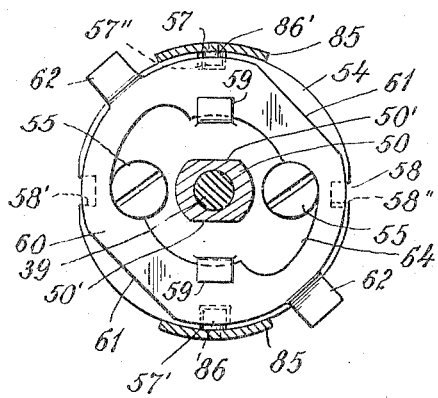
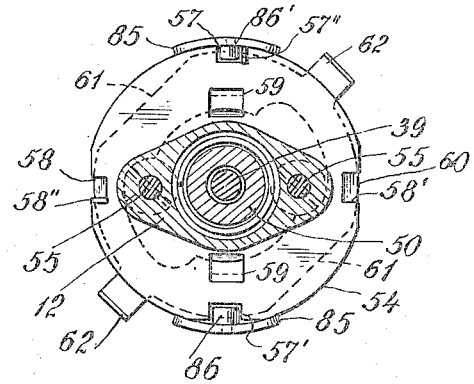
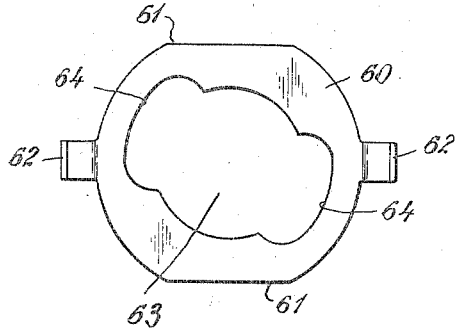
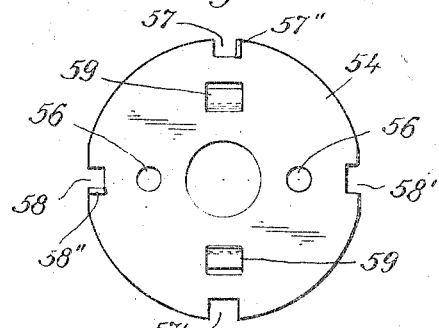

Patented Apr. 8, 1941

2,237,720

UNITED STATES PATENT OFFICE 2,237,720

TEMPERATURE REGULATOR

Benson F. Waddell, Jackson Heights, N. Y., assignor to The Wilcolator Company, Newark, N. J., a corporation of Delaware Application January 17, 1938, Serial No. 185,364

11 Claims. (Cl. 236—99)

This invention relates to regulators for use on heaters, refrigerators and other appliances, to control the temperature in an oven, cooling chamber or similar space, and is concerned more particularly with a novel regulator for this use including both a manually operable control element by which the supply of an operating medium to the appliance may be turned on or cut off at will, and a thermostatically actuated control element for regulating the rate of supply of the operating medium through the manually operable control element when the latter is turned on. The new regulator is provided with novel operating means including a handle for actuating the manually operable control element and having indicia thereon with reference to which a second handle is adjusted for moving the thermo-responsive control element to different temperature settings.

For the purpose of illustration, the principles of the present invention will be described and illustrated in connection with a regulator for a gas oven, although it will be understood that the invention is not limited to this use but may be employed in electric and other types of regulators as well.

A gas regulator made in accordance with the present invention comprises a cut-off valve which may be rotated selectively to an "on" position in which it connects the oven burner to a gas supply line, or to an "off" position in which it shuts off the supply of gas to the burner. The rate of flow of gas through the cut-off valve to the burner is controlled by a regulating valve which is operated by a thermostat subjected to the temperature in the oven. The thermo-responsive regulating valve is manually adjustable to vary the temperature which it is desired to maintain in the oven, and while the means for effecting manual adjustment of the regulating valve may take various forms, I prefer to employ for this purpose a control rod rotatable to adjust the connection between the thermostat and the regulating valve. A temperature adjustment handle is operatively connected to the control rod at a convenient location on the range, and a second handle preferably concentric with the temperature adjustment handle, is connected to the cut-off valve. Arranged on the handle for the cut-off valve is a dial or scale of gradations with reference to which the temperature adjustment handle is manipulated. The gradations on the handle which operates the cut-off valve are so arranged that when this handle is rotated to turn on the supply of gas to the burner, the gradations thereon are properly positioned to indicate accurately the oven temperature for which the temperature adjustment handle is set.

It will be apparent that with this construction one of the two operating handles constitutes a dial with reference to which the other is adjusted, and accordingly the use of a separate stationary dial for the temperature adjustment handle is avoided. The two operating handles may be disposed in close relation so that the gradations on the handle for the cut-off valve are visible around the periphery of the temperature adjustment handle with which the gradations cooperate, and by reason of this novel arrangement of the operating parts the regulator is of compact form and presents a pleasing appearance.

For a better understanding of the invention reference may be had to the accompanying drawings, in which Fig. 1 is a vertical, longitudinal section through one form of the new regulator;

Fig. 2 is a plan view of the regulator shown in Fig. 1;

Fig. 3 is a front view of the regulator shown in Figs. 1 and 2, with the handle for the cut-off valve in its "on" position.

Figs. 4, 5, 6 and 7 are transverse sections on the lines 4—4, 5—5, 6—6, and 7—7, respectively, in Fig. 1;

Fig. 8 is a detailed view of one part of the operating mechanism of the device shown in the preceding figures, and Fig. 9 is a detailed view of another part of the operating mechanism.

The regulator shown in the drawings is of the type employing a plug valve for turning on and cutting off the supply of gas to the burner, a thermostatically operated valve for governing the rate of flow of gas through the plug valve to the burner in accordance with the oven temperature, and a temperature adjustment rod extending through the plug valve and operable to adjust the connection between the regulating valve and the thermostat which controls it. A regulator of this type is described and illustrated in my copending application Serial No. 70,762, filed March 25, 1936, patented Mar. 21, 1939 as Patent No. 2,151,541, of which the present application is a continuation-in-part.

Referring to the drawings, the regulator there shown comprises a bulb 10 adapted to be mounted within the oven of a gas range, and a tube 11 leading therefrom to a casing 12 which is adapted to be secured, as hereinafter described, to the manifold 13 of the range. At its rear end, the casing 12 is provided with an opening over which is secured a cup 14, and a flexible metal bellows 15 is sealed within the cup to form an annular space 16 between the cup and bellows constituting an expansible and contractible chamber. The end of the cup 15 is sealed by a gasket 17 located between a flange 18 on the cup and an annulus 19. A disk 20 is disposed against the closed end of the bellows, and a rod 21 secured at its end to this disk extends through the central opening in the annulus 19. A spring 22 is arranged between the disk 20 and annulus 19 and tends to keep the bellows expanded by urging the rod 21 toward the right, as seen in Fig. 1.

Beyond the annulus 19, the rod 21 is provided with a threaded portion 24. A square nut 25 is arranged on the threaded portion of the rod, the flat sides 26 of the nut lying adjacent the inner sides of a square sleeve 27. The nut 25 is provided with a reduced end forming a shoulder 28, and a bimetallic compensating thermostatic lever 29 is adapted to engage the shoulder 28. The end of the thermostatic lever is bifurcated to fit over the reduced portion of the nut 25 and is bent, as shown at 29' (Fig. 1) to contact the shoulder 28. The thermostatic lever 29 is pivotally supported on a pin 30 and beyond the pivot pin is connected to the stem 31 of a valve member 32, which cooperates with a valve seat 33 to form a regulating valve. A coil spring 34 is engaged at one end with the valve member 32 and at the other end with a valve cap 35 and urges the valve member toward its seat. The valve cap 35 closes an opening in the casing through which access may be had to the regulating valve. The chamber 36 formed on the outlet side of the valve is provided with outlet openings 37 on opposite sides, as shown in Figs. 1 and 2 of the drawings. Either of the openings 37 may be connected to a pipe 38 leading to the oven burners (not shown) and the other opening closed by a plug (not shown).

The square sleeve 27 is connected to a rod or shaft 39 which projects through the front of the valve casing 12. In the forward portion of the valve casing is a conical section forming a seat for the rotatable valve member 41 of a cut-off valve. The valve 41 is of the plug type and is provided in its side wall with an opening 42 adapted to be aligned with an opening 42' at the bottom of the casing when the plug valve is in its open position. The cone-shaped valve member 41 and the correspondingly shaped portion of the casing forming its seat have their reduced ends toward the rear of the device, that is, away from the handle.

The regulator is provided with a gas inlet in the form of a nipple 43 connected with the manifold 13 by threads, as shown in Fig. 1, and this nipple is secured to the bottom of the casing 12 in alignment with the opening 42' by means of bolts 44 extending through the casing from the top thereof and threaded into a flange 45 on the nipple. The nipple 43 is externally threaded and is screwed into the manifold pipe 13 before the latter is mounted on the range and at the time when the gas cocks of the top burners of the oven are connected to the manifold. The nipple may be quite short so that the regulator is positioned so close to the manifold that its handle is in line with the burner handles across the front of the range. Between the flange 45 of the nipple and the bottom of the casing is a gasket 46 which aids in forming a gas-tight union between the flange and the coacting machined face of the casing. In connecting the regulator to the manifold 13, the nipple 43 is detached from the casing and screwed into the side wall of the manifold by applying a wrench to the flange 45, after which the casing is connected to the nipple by the bolts 44 extending through the flange. It will be apparent, therefore, that the flange 45 serves the dual function of accommodating the wrench and receiving the connecting bolts.

The valve member 41 is provided with a reduced extension 50 which projects forwardly through the front end of casing 12, the reduced portion 50 having diametrically opposed flattened portions 50', as shown particularly in Fig. 6. The rod 39 is provided with an enlargement 51 which fits within the bore of valve member 41 and forms a gas-tight seal between the front and rear ends of the bore. The valve member 41 is retained against the bore of the casing by a coil spring 52 which abuts at one end against the shoulder forming the front end of the conical portion of the valve member, and at the other end against a retaining plate 53 held against the front end of the casing. The retaining plate 53 is held in position on the casing by a latchplate 54 which is secured to the casing over the retaining plate 53 by screws 55 (Fig. 6), the latchplate being stationary with respect to the casing. As shown in Fig. 9, the latchplate 54 is provided with openings 56 through which the screws 55 extend and is further provided with a pair of diametrically opposed notches 57' and 57 and a second pair of diametrically opposed notches 58' and 58, the notches being spaced equidistantly about the periphery of the latchplate. The notches 57 and 58 differ from the notches 57' and 58' in that they are narrower and are provided with rearwardly extending ears or stops 57'' and 58'', respectively, which are struck from the plate. The latchplate 54 is also provided with a pair of lugs or ears 59 which are struck from the plate and are offset forwardly from the front of the plate (Fig. 1), the ears 59 being adapted to secure a key-plate 60 in position.

The key-plate 60, as shown particularly in Fig. 8, is in the form of a disk provided with diametrically opposed flattened portions 61 and a pair of diametrically opposed ears 62 arranged between the flattened portions. The key-plate is also provided with a central opening 63 having a pair of enlargements 64 which are likewise diametrically opposed. When the two plates 54 and 60 are assembled, the plate 60 is first turned 45° in a clockwise direction from the position shown in Fig. 8 to bring the enlargement 64 in alignment with the ears 59. The key-plate 60 is then turned counterclockwise 45° to the position shown in Fig. 6 to bring the edges of opening 63 which lie between the enlargements 64 to a position behind the ears 59. When the plates are thus assembled, the flattened portions 61 of the key-plate lie intermediate adjacent notches in the periphery of the latchplate (Fig. 6), and the key-plate is held on the latchplate by ears 59. The purpose of the key and latchplate combination will be described presently.

Mounted on the projecting portion 50 of the valve member 41 is a disk 66 provided with a central opening through which the projecting portion 50 extends. A rearwardly extending flange 67 (Fig. 5) surrounds the central opening in disk 66 and closely engages the diametrically opposed flattened portions 50' formed on plug valve 41, whereby rotation of disk 66 will cause the plug valve to turn with it. The rear end of flange 67 on the disk 66 abuts against a washer 68 which lies in the opening 63 in key-plate 60 against latchplate 54. As shown particularly in Fig. 5, the disk 66 is provided with a pair of diametrically opposed arcuate notches 69, each of which has a centrally disposed notch 70 extending inwardly from the base thereof.

The disk 66 and plug valve 41 may be turned by means of a handle 72 which is rotatable on a sleeve 73 mounted on rod 39 in abutting relation to disk 66. The front portion of sleeve 73 fits closely around the rod 39 and is closed at the front end to prevent rearward movement of the sleeve on rod 39. A key 74 projects inwardly from the bore of sleeve 72 into a keyway 75 formed in rod 39, whereby the rotation of the sleeve will cause the rod to turn with it. The handle 72 is held in position on sleeve 73 by a plate 76 closely surrounding the sleeve and fastened to the rear face of the handle by means of screws 77. The plate 76 coacts with a shoulder 78 on sleeve 73 and is normally urged forwardly against the shoulder by a coil spring 79 arranged in the central bore of handle 72, the spring 79 being engaged at its front end with a washer 80 held in the front portion of the handle, and at its rear end with a shoulder 81 on the sleeve 73. Disposed in front of the extension 50 within an enlargement of the bore in sleeve 73 is a coil spring 82 which abuts at its rear end against the front end of extension 50 and at its front end against a cotter pin 83 extending transversely through the rod 39. The coil spring 82 urges the rod 39 forwardly and the plug valve 41 in the opposite direction, so that the enlargement 51 of the rod is held tightly against the bore of the plug valve.

The handle 72 is operatively connected to disk 66 by a pair of rearwardly extending arms 85 integral with the plate 76. The arms 85 are diametrically opposed on plate 76 and extend through the arcuate notches 69 in disk 66. As shown particularly in Figs. 1, 6 and 7, the two arms 85 are provided near their inner ends with inwardly extending pins 86 and 86', respectively, the pin 86 on the lower arm 85 being somewhat larger in diameter than pin 86' on the upper arm. The pins 86, 86' are normally disposed in back of the key-plate 60 and engage the key-plate between the flattened portions 61 and the ears 62, the pins being yieldingly held against the key-plate by the forward thrust of coil spring 79 on handle 72.

A handle or knob 88 is fitted over the end of sleeve 73 and may be turned to rotate the sleeve and rod 39 independently of handle 72 and thereby adjust the threaded connection between the bellows 15 and valve 32. The knob 88 is formed with a central bore containing a collar 89 closely surrounding the reduced front portion of sleeve 73, the knob and collar 89 being fixed to the sleeve by a screw 90 threaded through the knob and collar and embedded in the sleeve. As shown particularly in Fig. 1, the knob 88 is considerably smaller in diameter than handle 72 and fits closely against the front of the latter. A pin 91 is fixed to the knob 88 and extends rearwardly into an annular space 92 formed in the front of handle 72, and the pin 91 coacts with a stop 93 (Fig. 4) on the handle to limit the rotation of the knob with respect thereto. The knob 88 is formed with a pointer 95 which cooperates with a scale of temperature graduations 96 arranged on the front of handle 72. The graduations 96 are so arranged on the handle that when the latter is in its "on" position (Fig. 3) wherein plug valve 41 is open, the temperature graduation indicated by the pointer of knob 88 corresponds to the temperature which will be maintained in the oven for the given setting of valve 32 by the knob.

When the regulator is not in use, the handle 72 is turned to the position wherein the word "off" thereon is at the top of the handle. In this position of the handle, the opening 42 in the cut-off valve is out of alignment with passage 42' leading to the manifold 13, and the pins 86 and 86' on arms 85 are disposed in notches 57' and 57, respectively, in plate 54, whereby the handle 72 is prevented from turning accidently. When it is desired to start the oven burner, the handle 72 is turned through 90° in a counterclockwise direction from its "off" position to the position shown in Fig. 3. Prior to this movement of the handle 72, the handle is pushed inwardly against the action of spring 79 to move pins 86 and 86' out of the notches of plate 54 in which they lie, whereby the handle is released to permit free turning thereof in a counterclockwise direction. During the turning movement of the handle, the pins 86 and 86' slide along the rear face of latchplate 60 until they arrive at the notches 58' and 58, respectively, whereupon the spring 79 snaps the handle outwardly so as to move the pins into the latter notches. This rotation of handle 72 also turns the disk 66 and cut-off valve 41 through an angle of 90° so that the opening 42 in the cut-off valve is moved into alignment with passage 42', thereby connecting the interior of the casing to manifold 13.

The knob 88 is then adjusted until the pointer 95 thereof registers with the graduation 96 corresponding to the temperature which it is desired to maintain in the oven. This movement of knob 88 rotates rod 39 so as to screw the nut 25 along the threaded extension of rod 21, thereby moving the thermostatic lever 29 about its pivot 30 and adjusting the position of the regulating valve 32. In other words, when the knob 88 is set to a desired temperature indicated on handle 72, the connection between bellows 15 and the regulating valve 32 is so adjusted that the thermostatic system, including the bulb 10 and bellows 15, will operate to throttle valve 32 when the desired oven temperature is reached, whereby only enough gas is supplied to maintain the oven at that temperature. When it is desired to turn off the oven, the handle 72 is pushed inwardly against the action of spring 79 so as to move the pins 86, 86' out of notches 58' and 58, respectively, and is then rotated in a clockwise direction to its initial "off" position, wherein the plug valve 41 cuts off the supply of gas to the oven burner. Rotation of the handle 72 is limited between the two positions referred to by means of the ears 57" and 58" adjacent notches 57 and 58, respectively.

The operating means for the regulator may be readily dissembled by moving the ears 62 on plate 60 in a counterclockwise direction from the position shown in Fig. 6. This movement of the plate 60 causes the flattened portions 61 thereof to assume positions opposite the notches 57' and 57 in which the pins 86, 86' are disposed. The handle 72 and sleeve 73 may then be withdrawn axially from the end of rod 39, the pins 86 and 86' on the handle moving through the notches 57' and 57 in plate 54 and through the notches 70 in disk 66.

It will be apparent that the manual operating means of the new regulator is of a simple and compact construction and presents a pleasing appearance. Both of the operating elements, the handle 72 and the knob 88, are carried by a single sleeve 73, so that the operating means may be removed as a unit by withdrawing the sleeve 73 from the end of rod 39. The regulator may be readily calibrated by loosening the screw 90 on knob 88, adjusting the knob relative to sleeve 73, and then tightening the screw to secure the knob in fixed relation to the sleeve. The sleeve 73 carrying the operating elements 72 and 88 may then be removed from and replaced on the rod 39 without affecting the calibration of the instrument, the sleeve being always replaced in the proper angular position on the rod by reason of the key and keyway connection 74, 75 between these parts.

The notches 57 and 58, being smaller than the notches 57' and 58' in plate 54, assure proper assembly of the operating parts, since the larger pin 86 on handle 72 is too large to pass through the notches 57 and 58. The large notch 58' is always covered by the plate 60, and accordingly the parts can be assembled only by passing the larger pin 86 through notch 57', whereby the handle 72 is always connected to the cut-off valve in the proper angular relation thereto. The handle 72 is held securely in its "on" position by the pins 86 and 86' in notches 57' and 57, respectively, so that the knob 88 may be adjusted freely without moving the handle and cut-off valve.

Since the adjustment rod 39 is carried by the cut-off valve 41, and is fitted closely in the latter, so as to provide an adequate seal, rotation of the cut-off valve by handle 72 causes a turning of the rod 39. Thus, the temperature adjustment knob 88 turns with rod 39 and handle 72 and continues to indicate on the latter the selected temperature setting during rotation of the handle 72. This is a desirable feature because it allows the operator to adjust the knob 88 to a desired temperature setting and then move the handle 72 from one position to the other without affecting this setting. However, when the adjustment knob 88 is turned, the adjustment means including rod 39 moves independently of the cut-off valve, because the latter is held against movement by its tight fit in the casing.

I claim:

1. In a thermostatic controller for regulating the supply of an operating medium to a device to be controlled, the combination of a casing, a main control element in the casing for turning on and shutting off the supply of said operating medium, a thermo-responsive control element in the casing for regulating the rate of supply of the operating medium through the main control element, a removable member outside the casing operatively connected to one of said control elements, a handle carried by said member for rotating the same, and a second handle carried by said member and movable independently thereof to actuate the other of said control elements, said handles being removable from the casing on said member as a unit.

2. In a thermostatic controller for regulating the supply of an operating medium to a device to be controlled, the combination of a casing, a main control element in the casing for turning on and shutting off the supply of said operating medium, a thermo-responsive control element in the casing for regulating the rate of supply of the operating medium through the main control element, a rotatable control rod operatively connected to said thermo-responsive control element, and projecting from the front of the casing, a sleeve removably mounted on said control rod and rotatable therewith, a handle carried by said sleeve for rotating the control rod to adjust said thermo-responsive control element to different temperature settings, a second handle carried by said sleeve and rotatable independently thereof to actuate said main control element, the handles being removable from the control rod on said sleeve as a unit, and indicia on the second handle for indicating the temperature setting of said thermo-responsive control element for different positions of the first handle.

3. In a thermostatic controller for regulating the supply of an operating medium to a device to be controlled, the combination of a casing, a main control element in the casing for turning on and shutting off the supply of said operating medium, a thermo-responsive control element in the casing for regulating the rate of supply of the operating medium through the main control element, a rotatable control rod operatively connected to said thermo-responsive control element and projecting from the front of the casing, a sleeve removably mounted on said control rod and rotatable therewith, a handle carried by said sleeve for rotating the control rod to adjust said thermo-responsive control element to different temperature settings, a second handle carried by said sleeve and rotatable independently thereof to actuate said main control element, the handles being removable from the control rod on said sleeve as a unit, releasable latch means carried by the casing, and means carried by one of said handles and cooperating with the latch means to secure said sleeve against removal from the control rod.

4. In a thermostatic controller for regulating the supply of an operating medium to a device to be controlled, the combination of a casing, a main control element in the casing for turning on and shutting off the supply of said operating medium, a thermo-responsive control element in the casing for regulating the rate of supply of the operating medium through the main control element, a rotatable control rod operatively connected to said thermo-responsive control element and projecting from the front of the casing, a sleeve removably mounted on said control rod and rotatable therewith, a handle carried by said sleeve for rotating the control rod to adjust said thermo-responsive control element to different temperature settings, a second handle carried by the sleeve and rotatable independently thereof to actuate said main control element, the second handle being movable axially on the sleeve, and both of said handles being removable from the control rod on said sleeve as a unit, and releasable locking means for securing the second handle against rotation when the main control element is turned on, said last means including a member carried by the casing, and means carried by the second handle and engageable with said member to lock the second handle and releasable from the member by axial movement of the second handle in one direction.

5. A thermostatic controller comprising a casing having inlet and outlet ports, a rotatable cut-off valve in the casing for controlling flow through the outlet port, said valve having a part projecting from the front of the casing, a thermo-responsive valve in the casing for controlling the rate of flow through the outlet port, a control rod extending through the cut-off valve and rotatable therein to adjust the thermo-responsive valve to different temperature settings, a disk outside the casing carried by said projecting part of the cut-off valve and operatively connected thereto, a sleeve operatively connected to the control rod outside the casing and removable from the front end of the rod, the rear end of the sleeve being in substantially abutting relation to the disk to prevent removal thereof from the projecting part of the cut-off valve, a handle mounted on the sleeve and operable to adjust the control rod, a second handle carried by the sleeve and rotatable independently thereof, an operative connection between the second handle and disk whereby rotation of the second handle operates the cut-off valve, said handles being removable from the control rod on said sleeve as a unit, and indicia on one of said handles cooperating with an index on the other to indicate the temperature setting of said thermo-responsive valve corresponding to different positions of the first handle.

6. A thermostatic controller comprising a casing having inlet and outlet ports, a rotatable cut-off valve in the casing for controlling flow through the outlet port, said valve having a part projecting from the front of the casing, a thermo-responsive valve in the casing for controlling the rate of flow through the outlet port, a control rod extending through the cut-off valve and rotatable therein to adjust the thermo-responsive valve to different temperature settings, a disk outside the casing carried by said projecting part of the cut-off valve and operatively connected thereto, a sleeve operatively connected to the control rod outside the casing and removable from the rod, said sleeve having a shoulder thereon, a handle mounted on the sleeve and operable to adjust the control rod, a second handle carried by the sleeve and rotatable independently thereof, said second handle being movable axially on the sleeve and both of the handles being removable from the control rod on said sleeve as a unit, a coil spring surrounding the sleeve and engaged at one end with said shoulder and at the opposite end with the second handle, the spring normally urging the second handle axially in one direction on the sleeve, locking means secured to the casing, and an operative connection between the second handle and disk and cooperating with the locking means to secure said handles and sleeve against removal from the control rod and to lock the second handle against rotation, the second handle being movable axially against the action of the spring to render the locking means ineffective, whereby the second handle may be rotated to actuate the cut-off valve.

7. A thermostatic controller comprising a cut-off valve, a regulating valve controlling the rate of flow through the cut-off valve, a thermostat, a connection between the thermostat and the regulating valve, a handle for actuating the cut-off valve, a handle substantially concentric with said first handle and movable relative thereto to different temperature settings for adjusting said connection, a friction drive between the handles for moving the temperature adjustment handle with said handle for the cut-off valve, means for securing the handle for the cut-off valve against movement during manipulation of the temperature adjustment handle, and indicia on the first handle for indicating different temperature settings of the second handle.

8. In a thermostatic controller, the combination of a casing, a control element in the casing for turning on and shutting off the supply of an operating medium to a device to be controlled, a thermo-responsive control element for controlling the rate of flow of said medium through the first control element, a pair of handles rotatable about a common axis and forming a single dial unit, an operative connection between one of said handles and the first control element, an operative connection between the other handle and the thermo-responsive control element, means for securing the handle for the first control element against movement during manipulation of the other handle to different temperature settings, one of the handles having numerals thereon cooperating with an index on the other handle to indicate the temperature setting of the second handle, and a friction drive between the handles for causing the temperature adjustment handle to move with the handle for the main control element.

9. In a thermostatic controller for regulating the supply of an operating medium to a device to be controlled, the combination of a control element for turning on and shutting off the supply of the operating medium, a thermo-responsive control element for regulating the rate of supply of the operating medium through the main control element, a handle for actuating the first control element, a handle substantially concentric with said first handle and movable relative thereto for adjusting the thermo-responsive control element, a driving connection between the handles for moving the temperature adjustment handle with said handle for the first control element but permitting movement of the temperature adjustment handle relative to the other handle, means for securing the handle for the first control element against movement during manipulation of the temperature adjustment handle, and temperature graduations on one of the handles and a cooperating index on the other for indicating different temperature settings of said adjusting handle.

10. A thermostatic controller comprising a cut-off valve, a thermo-responsive regulating valve for controlling the rate of flow through the cut-off valve, a handle for the cut-off valve, a temperature adjustment handle substantially concentric with said first handle and rotatable relative thereto for adjusting the regulating valve, a rod extending through a bore in the cut-off valve for connecting the regulating valve to the temperature adjustment handle, the rod having a frictional engagement with the cut-off valve to cause the rod and the temperature adjustment handle to turn with the cut-off valve and the first handle, and temperature graduations on one handle and a cooperating index on the other for indicating different temperature settings of the adjustment handle.

11. In a gas regulator, a casing having a valve seat and a gas port opening into the seat, a hollow cut-off valve in the casing coacting with the seat and rotatable in the casing, a manually adjustable temperature regulating valve in the casing for controlling flow through the cut-off valve and including a valve member and a seat, a thermo-responsive element controlling the regulating valve and located in the casing beyond the inner end of the cut-off valve, adjusting means extending through the cut-off valve generally parallel to the axis thereof, the adjusting means being mounted in the cut-off valve for rotation therewith but also being rotatable relative to the cut-off valve, the cut-off and the adjusting means together defining a gas way in the cut-off valve extending partly along the adjusting means and adapted to connect said port with the regulating valve, a handle for turning the cut-off valve to move a part of said gas way into and out of alignment with the port, a second handle substantially concentric with said first handle for moving the adjusting means, indicia on one of said handles and a cooperating index on the other for indicating the temperature setting of the second handle, and an operative connection between the inner part of said adjusting means and the regulating valve to adjust the regulating valve when the adjusting means is rotated.

BENSON F. WADDELL.